United States Patent
Belford et al.

(10) Patent No.: US 12,507,711 B2
(45) Date of Patent: Dec. 30, 2025

(54) FROZEN DESSERT COMPOSITIONS COMPRISING ALLULOSE AND LOW-SUGAR SYRUP/SOLIDS

(71) Applicant: CORN PRODUCTS DEVELOPMENT, INC., Westchester, IL (US)

(72) Inventors: Andrea Belford, Bridgewater, NJ (US); Didem Icoz, Bridgewater, NJ (US)

(73) Assignee: Corn Products Development, Inc., Westchester, IL (US)

(*) Notice: Subject to any disclaimer, the term of this patent is extended or adjusted under 35 U.S.C. 154(b) by 524 days.

(21) Appl. No.: 18/007,802

(22) PCT Filed: Jun. 1, 2021

(86) PCT No.: PCT/US2021/035149
§ 371 (c)(1),
(2) Date: Dec. 2, 2022

(87) PCT Pub. No.: WO2021/247503
PCT Pub. Date: Dec. 9, 2021

(65) Prior Publication Data
US 2023/0217952 A1 Jul. 13, 2023

Related U.S. Application Data

(60) Provisional application No. 63/033,580, filed on Jun. 2, 2020.

(51) Int. Cl.
*A23G 9/34* (2006.01)
*A23G 9/40* (2006.01)

(52) U.S. Cl.
CPC ............. *A23G 9/34* (2013.01); *A23G 9/40* (2013.01)

(58) Field of Classification Search
None
See application file for complete search history.

(56) References Cited

U.S. PATENT DOCUMENTS

| | | | |
|---|---|---|---|
| 5,358,728 A | 10/1994 | Martin et al. | |
| 2018/0368457 A1 | 12/2018 | Pandey et al. | |
| 2021/0120855 A1 | 4/2021 | Park et al. | |

FOREIGN PATENT DOCUMENTS

| | | | |
|---|---|---|---|
| CN | 111134230 | 5/2020 | |
| CN | 111134230 A * | 5/2020 | ............ A23G 9/34 |
| KR | 101709257 | 3/2017 | |
| WO | 2015/075473 | 5/2015 | |
| WO | 2017/037111 | 3/2017 | |
| WO | 2017/037112 | 3/2017 | |
| WO | 2020/005022 | 1/2020 | |

OTHER PUBLICATIONS

Chocolate Ice Cream, Mintel GNPD, Mar. 2018, https://portal.mintel.com (5 pages).
Green Tea Ice Cream, Mintel GNPD, Mar. 2018, https://portal.mintel.com (4 pages).

* cited by examiner

*Primary Examiner* — Jyoti Chawla
(74) *Attorney, Agent, or Firm* — Jason Grauch

(57) ABSTRACT

Described herein are frozen dessert compositions containing allulose and low-sugar syrups and/or solids, along with use of the allulose and low-sugar syrups and/or solids in frozen dessert compositions. Beneficially, the compositions described herein reduce added sugars and/or caloric content of a frozen dessert while overcoming formulation limitations of low- or reduced-sugar frozen dessert products, including matching the hardness, texture, and/or sweetness of their full-sugar counterparts.

6 Claims, 4 Drawing Sheets

FROZEN DESSERT COMPOSITIONS COMPRISING ALLULOSE AND LOW-SUGAR SYRUP/SOLIDS

CROSS-REFERENCE TO RELATED APPLICATIONS

This application is a US National Stage under 35 USC § 371 of International Application No. PCT/US2021/035149, filed Jun. 1, 2021, which claims priority to U.S. Provisional Patent Application No. 63/033,580, filed Jun. 2, 2020, which are both hereby incorporated herein by reference in their entirety.

This application claims priority under 35 U.S.C. § 119 to Provisional Application U.S. Ser. No. 63/033,580, filed on Jun. 2, 2020, which is hereby incorporated herein by reference in its entirety.

Described herein are frozen dessert compositions containing allulose and low-sugar syrups and/or solids, along with use of the allulose and low-sugar syrups and/or solids in frozen dessert compositions. Beneficially, the compositions described herein reduce added sugars and/or caloric content of a frozen dessert while overcoming formulation limitations of low- or reduced-sugar frozen dessert products, including matching the hardness, texture, and/or sweetness of their full-sugar counterparts.

Due to increased health concerns and campaigns to reduce sugar intake, consumer demand for low-sugar, low-calorie food products continues to increase. In response to this demand, food product manufacturers continue to look for nutritive sweetener alternatives that will provide low-sugar, low-calorie food products that are comparable to the full-sugar counterparts (e.g., in taste, texture, mouthfeel, etc.) that consumers have come to know and enjoy. As a result, there has been an increase in the use of natural/synthetic sweeteners in food products, including frozen dessert products. Allulose is an example of a natural sweetener that has been formulated into various food and beverage products. For example, food products containing high levels of allulose have been made in an attempt to provide food products exhibiting the desired bulking, sweetening and functional properties traditionally provided by nutritive sweeteners. See, e.g., WO2015/075473. However, there are limitations with prior art formulations, which have not been modified to accommodate the unique properties of allulose, and therefore the prior art fails to provide low-calorie, reduced-sugar food product formulations which meet the expectations of consumers and food manufacturers. Accordingly, there remains a need in the art to reduce the nutritive sweetener content of frozen dessert formulations in a manner that does not compromise the properties consumers and food product manufacturers desire in a low-sugar, low-calorie frozen dessert food product.

Nutritive sweeteners such as, e.g., sucrose, glucose, fructose, corn syrup (including high fructose corn syrup), maltose, lactose, molasses, honey, agave and others, contribute to caloric content. Natural and synthetic sweeteners (i.e. artificial sweeteners) offer low caloric alternatives to nutritive sweeteners, providing desirable taste characteristics as well as other functional properties. Such natural/synthetic sweeteners include, e.g., high potency or high intensity sweeteners (e.g. sucralose, stevia, etc.), sugar alcohols or polyols (e.g. xylitol, sorbitol, etc.), and rare sugars (e.g., allulose). Allulose is found in nature in very small amounts, such as raisins and figs and is also referred to as D-allulose, psicose, or D-psicose. Allulose provides approximately 70% of the sweetness of sucrose with only 10% of the calories (approximately 0.4 kcal/g).

Nutritive sweeteners are also commonly included in frozen dessert food products, such as ice cream, to provide a sweet taste but also provide solids to prevent all the available water in the formula from freezing, which creates a hard texture and large ice crystals. Due to the different molecular make up of sweeteners, the freezing point can vary depending on the size and amount of sweetener in the formula. In general, monosaccharides have double the solutes in solution compared to disaccharides and can cause the freezing point to decrease, which in-turn creates a soft frozen dessert. By way of example, allulose, an epimer of fructose, is a monosaccharide versus sucrose which is a disaccharide, and as such allulose provides a frozen dessert that is softer than its sucrose containing counterpart, which is not desired by consumers or manufacturers. A softer frozen dessert product contains more unfrozen water in the system, which, when subjected to regular freezer storage conditions and associated freeze/thaw cycles, migrates to create large ice crystals that decrease the smooth mouthfeel of such frozen dessert products.

Accordingly, disclosed herein are frozen dessert compositions and methods of making the same, wherein such compositions contain allulose in combination with low-sugar syrups and/or low-sugar solids (LSS) to provide a desired hardness, texture and sweetness that a consumer expects from a conventional full sugar frozen dessert composition.

One embodiment is directed to a frozen dessert composition comprising at least about 2 wt-%, 2.5 wt-%, 3 wt-%, 3.5 wt-%, or 4 wt-% allulose (dry basis) or greater than 3.5 wt-% allulose (dry basis); at least one low sugar syrup, low sugar solid, or combination thereof; and at least one dairy or dairy alternative product; wherein said frozen dessert composition further comprises about 25% to about 50% by weight solids or about 28% to about 46% by weight solids.

Another embodiment is directed to a frozen dessert composition comprising at least about 2 wt-%, 2.5 wt-%, 3 wt-%, 3.5 wt-%, or 4 wt-% allulose (dry basis) or greater than 3.5 wt-% allulose (dry basis); at least one low sugar syrup, low sugar solid, or combination thereof; and at least one dairy or dairy alternative product; wherein said frozen dessert composition further comprises about 25% to about 50% by weight solids or about 28% to about 46% by weight solids, further wherein the low sugar syrup has (i) a DE>24, a DE of 25 to 40, or a DE of 26 to 34; (ii) a DP4 content less than 30%, less than about 25%, less than about 20%, or less than about 15% by weight; (iii) DP8+ content less than 25%, less than about 20%, less than about 15%, less than about 10%, or less than about 5% by weight; (iv) DP10+ content less than 25%, less than about 20%, less than about 15%, less than about 10%, or less than about 5% by weight; (v) a DP3+ content (per 100 grams of the composition) that is at least about ≥4.8; (vi) a (DP1+DP2)/DP3+ ratio that is at least about ≤2.8; or (vii) any combination of (i) to (vi).

In yet another embodiment, the frozen dessert composition described herein comprises: allulose; a LSS; and at least one dairy or dairy alternative product; wherein the composition has a percentage of solids within 5% of the percentage of solids of a full-sugar control composition, wherein the control composition does not replace one or more nutritive sweetener such as sucrose and/or high DE corn syrup with allulose and/or the LSS, and wherein the composition has an average hardness measurement (grams of force) that is within about-20% of the average hardness measurement of the full sugar control composition.

In some embodiments, the allulose-containing frozen dessert composition having low-sugar and/or calorie content described herein exhibits comparable hardness to its full-sugar counterpart.

In another embodiment, the frozen dessert composition having low-sugar and/or calorie content described herein comprises: replacing at least a portion of one or more nutritive sweetener in a frozen dessert composition with allulose and a LSS; and forming a frozen dessert composition that has (i) a percentage of solids within 5% of the percentage of solids of a full-sugar control composition, wherein the full-sugar control composition does not replace one or more nutritive sweetener with allulose and/or the LSS, and (ii) an average hardness measurement (grams of force) within about-20% of the average hardness measurement of the full-sugar control composition.

Various embodiments will be described in detail with reference to the drawings, wherein like reference numerals represent like parts throughout the several views. And while multiple embodiments are disclosed herein, still other embodiments will become apparent to those skilled in the art from the following detailed description, which shows and describes illustrative embodiments. As a result, reference to various embodiments does not limit the scope of the invention. Additionally, the figures represented herein are not limitations to the various embodiments according to the invention and are presented for exemplary illustration of the invention. Accordingly, the drawings and detailed description are to be regarded as illustrative in nature and not restrictive.

Figure 1:
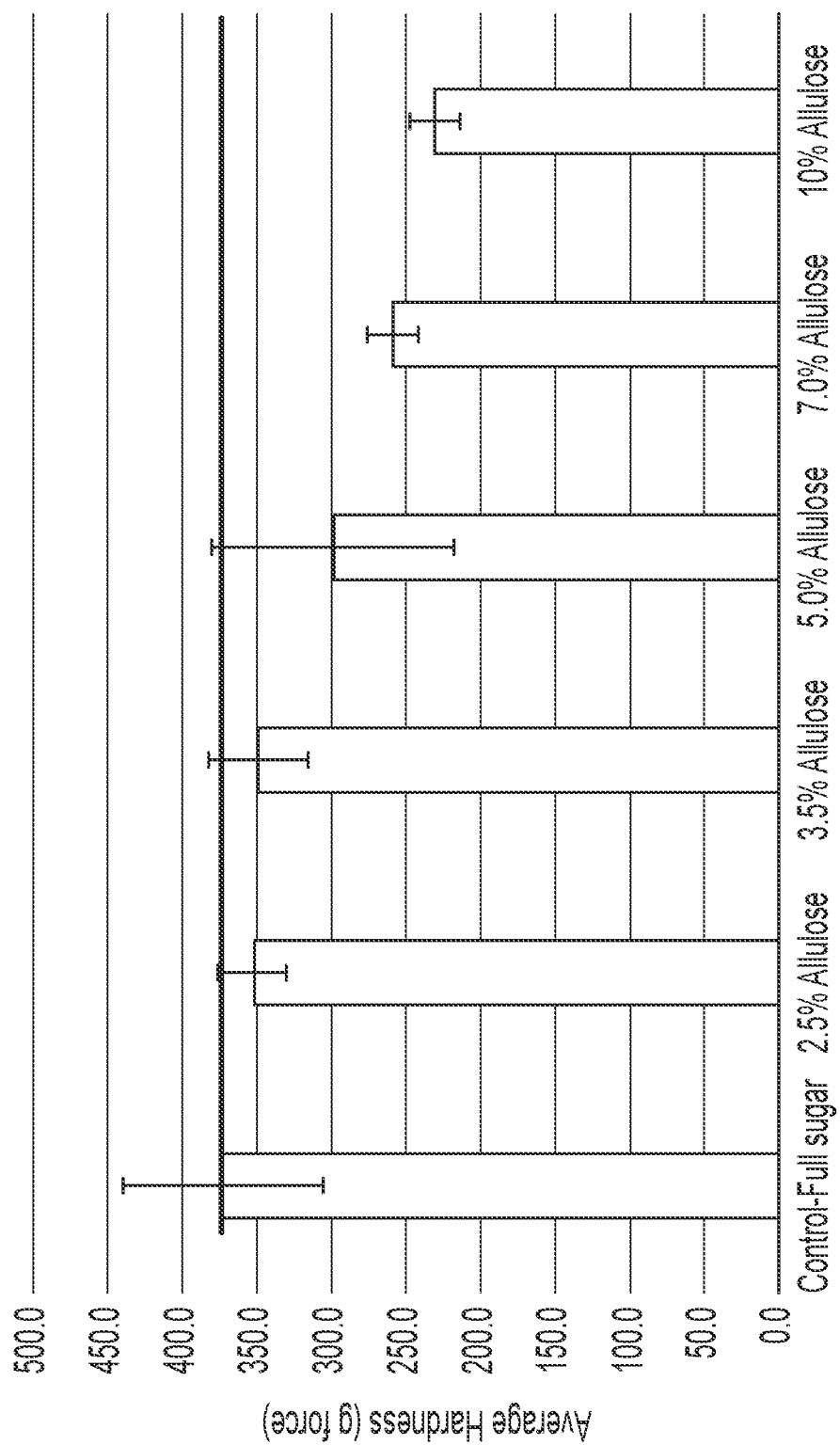
FIG. 1 shows measurements of hardness of full sugar control and 2.5-10% (dry basis) allulose containing reduced fat ice-cream samples as described in Example 1.

All terminology used herein is for the purpose of describing particular embodiments only, and is not intended to be limiting in any manner or scope. For example, as used in this specification and the appended claims, the singular forms "a," "an" and "the" can include plurals unless the context clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present compositions and methods may be more readily understood, certain terms are first defined.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation. In describing and claiming the embodiments, the following terminology will be used in accordance with the definitions set out below.

The term "about," as used herein, refers to variations in the numerical quantity that can occur, for example, through typical measuring and handling procedures; through inadvertent error in these procedures; through differences in the manufacture, source, or purity of the ingredients; and the like. Whether or not modified by the term "about", the claims include equivalents to the quantities.

As used herein, the term "free" refers to compositions completely lacking the component or having such a small amount of the component that the component does not affect the performance of the composition. The component may be present as an impurity or as a contaminant and shall be less than 0.5 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Frozen Dessert Compositions

Described herein are frozen dessert compositions having low-sugar and/or calorie content comprising allulose as a complete or partial replacement for nutritive sweeteners, including sucrose. In one embodiment, the frozen dessert compositions described herein comprise allulose, a LSS, and at least one dairy or dairy alternative product. In some embodiments, the allulose-containing frozen dessert composition having low-sugar and/or calorie content described herein may further comprise one or more additional ingredient selected from nutritive sweeteners and/or non-nutritive sweeteners that have not been fully replaced by allulose and the LSS; stabilizing agents; flavorings and/or extracts; and/or other ingredients, such as those described herein. Exemplary frozen dessert compositions are shown in Table 1.

TABLE 1

Exemplary Frozen Dessert Compositions

| Material | First Exemplary Range wt-% | Second Exemplary Range wt-% | Third Exemplary Range wt-% |
| --- | --- | --- | --- |
| Allulose | 2-50 | 2.5-20 | 3.5-10 |
| Low Sugar Syrup/Solids | 5-50 | 10-50 | 10-45 |
| Dairy (or dairy alternative) product(s) | 30-95 | 40-90 | 50-90 |
| Additional Functional Ingredients | 0-40 | 0-30 | 0-20 |

In some embodiments, the allulose replaces or substantially reduces the use of nutritive sweeteners in a frozen dessert composition, such that the nutritive sweeteners contained therein are reduced by at least about 10%, 20%, 30%, 40%, 50%, 55%, 60%, 65%, 70%, 75%, 80%, 85%, 90%, 95%, or 100% from the full-sugar control. In other embodiments, the nutritive sweetener is one or more nutritive carbohydrate sweetening agent(s). In other embodiments, the nutritive carbohydrate sweetening agent is selected from sucrose, glucose, fructose, high fructose corn syrup, dextrose, high DE corn syrups (e.g. higher than 36DE corn syrup), beet or cane sugar, molasses, maltose, honey, and maple sugar.

Beneficially, the replacement of nutritive sweeteners with allulose provides a sufficiently solid frozen dessert composition, wherein the combination of the LSS with the allulose does not result in a soft frozen dessert composition. In some embodiments, the allulose-containing frozen dessert compositions described herein have an average hardness measurement (grams of force) that is within about 10% or less or 20% or less of the average hardness measurement of a full-sugar control composition (i.e. a full sugar composition that did not replace the nutritive sweetener such as sucrose with allulose and/or LSS). In one embodiment, the average hardness measurement (grams of force) of the allulose-containing frozen dessert composition described herein is within about 1%, 2%, 3%, 4%, 5%, 6%, 7%, 8%, 9%, 10%, 11%, 12%, 13%, 14%, 15%, 16%, 17%, 18%, 19% or 20% of the average hardness measurement of the full-sugar control composition. In further embodiments, the average hardness measurement (grams of force) of the allulose-containing frozen dessert composition described herein is within about 10%, 15%, or 20% of the average hardness measurement of a full-sugar control composition.

Without being limited by a particular mechanism of action, combining the allulose and LSS to replace at least a portion of the nutritive sweetener is beneficially balanced with the formulation of the frozen desert composition itself to provide a percentage of solids in the one or more allulose-containing frozen dessert composition described herein that is within about 5% of the percentage of the absolute value of the percentage solids in the full-sugar control composition. As referred to herein with respect to the percentage of solids in the low-sugar, low-calorie frozen dessert compositions described herein and the full-sugar control compositions, an acceptable variation in the percentage of solids refers to an absolute value of percent solids in the low-sugar, low-calorie frozen dessert compositions that varies no more than 1%, or no more than 5% from the percentage of the absolute value of the solids in the full-sugar control composition.

In additional embodiments, the low-sugar, low-calorie frozen dessert compositions described herein provide at least a 20% reduction in "added" sugar by replacing at least a portion of nutritive sweeteners with allulose and a LSS. In additional embodiments, the allulose and LSS provides at least a 25%, 30%, 35%, 40%, 45%, 50%, 55%, 60%, 65%, 70%, 75%, 80%, 85%, 90%, 95%, or 100% reduction in "added" sugar (wherein added sugars are defined as mono- and disaccharides from sweeteners, including the LSS and not including allulose and/or sugars in the frozen dessert composition (e.g. dairy ingredients such as lactose)).

In still further embodiments, the low-sugar, low-calorie frozen dessert compositions described herein provide at least a 2% reduction in caloric content by replacing at least a portion of nutritive sweeteners with the allulose and LSS. In additional embodiments, the replacement of nutritive sweeteners with allulose and a LSS provides at least a 5%, 10%, 15%, 20%, 25%, 30%, 35%, 40%, 45%, or at least 50% reduction in calories.

In another embodiment, the allulose-containing frozen dessert composition described herein has a DP3+ content (per 100 grams of the composition) that is at least about ≥4.8. In another embodiment, the frozen dessert composition has a (DP1+DP2)/DP3+ ratio that is at least about ≤2.8. The calculation of the DP3+ content and the (DP1+DP2)/DP3+ only includes the sugars and sweeteners included from the allulose, LSS and nutritive sweeteners in the compositions.

In yet another embodiment, one or more allulose-containing frozen dessert composition described herein comprises about 25% to about 50% by weight solids or about 28% to about 46% by weight solids.

Allulose

Described herein is a frozen dessert composition comprising an allulose source. Allulose is a commercially-available monosaccharide having the following structure, which is a C3 epimer of D-fructose:

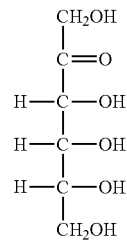

Allulose is available in crystalline form or in the form of a syrup comprising allulose. The syrup forms comprise allulose in varying amounts of percent solids (generally between about 60% to about 90% by weight).

An exemplary allulose source is available under the tradename ASTRAEA® Liquid Allulose, with 95% purity (dry solids basis, ds or DS) and at 74% solids. Additional allulose sources may have a purity (expressed as weight % allulose, based on the total weight of the allulose source) of at least 80%, at least 85%, at least 90%, at least 95%, at least 96%, at least 97%, at least 98%, at least 99%, or at least 99.9%, or 100% pure allulose. Additional allulose sources may have a percent solids of at least about 65%, at least about 70%, at least about 75%, or greater.

In some embodiments, the allulose source is a mixture of allulose and additional monosaccharides and disaccharides, determined according to the purity level of the allulose. In some embodiments, the allulose source may be an admixture of allulose and one or more other sugars, such as fructose. In some embodiments the allulose source is a syrup comprising from about 85 wt-% to about 95 wt-% allulose and from about 5 wt-% to about 15 wt-% of monosaccharides and disaccharides, based on the dry matter content of the syrup.

The allulose is suitable for use as a single ingredient replacement for a nutritive sweetener (e.g. sucrose), either partial or complete replacement, in one or more frozen dessert composition described herein to provide a beneficial reduction in sugars and calories. In some embodiments, the LSS is suitable for use in combination with allulose to replace one or more nutritive sweetener (e.g. sucrose, high DE glucose syrup) to provide additional benefit for added sugar reduction.

In a further embodiment, the allulose comprises from about 2 wt-% to about 50 wt-% of the frozen dessert composition, about 2 wt-% to about 10 wt-% of the frozen dessert composition, from about 3.5 wt-% to about 20 wt-% of the frozen dessert composition, from about 3.5 wt-% to about 10 wt-% of the frozen dessert composition, from about 4 wt-% to about 50 wt-% of the frozen dessert composition, from about 4 wt-% to about 20 wt-% of the frozen dessert composition, or from about 4 wt-% to about 10 wt-% of the frozen dessert composition.

Low Sugar Syrups/Solids (LSS)

One or more low-sugar, low calorie frozen dessert composition described herein contains one or more LSS having low mono- and di-saccharide content. In some embodiments, the one or more low-sugar, low-calorie frozen dessert composition described herein contains two or more LSS having low mono- and di-saccharide content. Low mono- and di-saccharide content (DP1 and DP2, respectively) as referred to herein means less than about 40%, 50%, 55%, 60%, 70%, or 85% DP1+DP2 compared to full sugar syrup (i.e. standard high DE glucose, corn syrup or tapioca syrup and such). In an exemplary embodiment, a DP1+DP2 content of a LSS at least 50% less DP1+DP2 content compared to a full sugar syrup/solid. Beneficially, the LSS provides a nutritive sweetener that is caloric with lower DP1+DP2 content compared to full sugar syrups/solids.

In another embodiment, the LSS have a DP1+DP2 content of less than about 25%, less than about 20%, less than about 18%, less than about 17%, less than about 16%, less than about 15%, less than about 14%, less than about 13%, less than about 12% less than about 11%, or less than about 10%.

In some embodiments, the LSS or low sugar syrup has a DP4 content less than 30%, less than about 25%, less than about 20%, or less than about 15% by weight. In another embodiment, the LSS or low sugar syrup has a DP8+ content less than 25%, less than about 20%, less than about 15%, less than about 10%, or less than about 5% by weight. In another embodiment, the LSS or low sugar syrup has a DP10+ content less than 25%, less than about 20%, less than about 15%, less than about 10%, or less than about 5% by weight.

Exemplary low sugar syrups are available under the tradenames VERSASWEET® 1524 glucose syrup, VERSASWEET® 1526 glucose syrup, VERSASWEET® 1526 NGM glucose syrup, VERSASWEET® 1531 glucose syrup, VERSASWEET® 1721 glucose syrup, STABLESWEET® glucose syrup, BIOLIGIO® ML6810 glucose syrup, MULTIVANTAGE® syrup, VERSYRA™ corn syrup, and CLEARDEX® glucose syrup. Exemplary low sugar solids are available under the tradenames GLOBE® 22DE glucose solids, and GLOBE® 24DE glucose solids, DRY GL™ Corn Syrup Solids.

Beneficially and without being limited to any particular mechanism of action or theory, the LSS and allulose in combination overcome the high monosaccharide (DP1) content of allulose (which decreases the freezing point depression (FPD) and causes the frozen dessert composition to have a soft texture) to provide a low-sugar, low-calorie frozen dessert composition with desirable textural attributes and hardness.

In another embodiment, the low sugar syrup(s) comprise greater than 5 wt-%, from about 5 wt-% to about 50 wt-% of the frozen dessert composition, from about 10 wt-% to about 50 wt-% of the frozen dessert composition, from about 10 wt-% to about 45 wt-% of the frozen dessert composition, or from about 15 wt-% to about 40 wt-% of the frozen dessert composition.

In yet another embodiment, the low sugar syrup(s) replace or substantially reduce the use of nutritive sweeteners, such as sucrose, glucose, fructose, corn syrup, high fructose corn syrup, etc. in the frozen dessert composition, such that the nutritive sweeteners contained in the frozen dessert composition described herein can be reduced by at least about 10%, 20%, 30%, 40%, 50%, 60%, 70%, 80%, 90% or 100% compared to the full-sugar counterpart.

In another embodiment, the LSS has a DE>24. In yet another embodiment, the LSS has a DE of 25 to 40 or 26 to 34. In still another embodiment, the Low sugar syrup has a DE>24. In still another embodiment, the low sugar syrup has a DE of 25 to 40 or 26 to 34.

Dairy (or Dairy Alternative) Products

The frozen dessert compositions include at least one dairy or dairy alternative product. In some embodiments, the frozen dessert compositions include two or more dairy or dairy alternative products. As referred to herein, dairy products include any type of dairy product including cream (e.g. heavy cream), whole milk, reduced fat milk, non-fat milk (e.g. skim milk), milk solids, condensed milk, or any combination thereof, specifically a combination of cream and skim milk. The dairy products can be provided as creams, butters, milk solids, dry powders, or the like. The dairy products generally comprise an amount of dairy protein, for example whey protein containing beta-lactoglobulin, alpha-lactalbumin, or serum albumin; and the like. In some embodiments, the dairy product may be replaced with an amount of a dairy alternative product such as soymilk, almond milk, coconut milk, the like, or any combination thereof.

The dairy or dairy alternative products can include variations in amount of fat contained therein; from full-fat to low fat to non-fat (i.e. zero fat). As one skilled in the art will ascertain, fat increases the richness of the frozen dessert compositions and also acts as a suitable carrier for flavorings. Moreover, it is beneficial to include at least one dairy or dairy alternative product having fat contained therein to provide a smooth and desirable texture to the frozen dessert compositions. In some embodiments, the dairy (or dairy alternative) product that is a low or non-fat product can also be combined with additional fat sources (including non-animal fat sources, e.g. coconut oil, cocoa butter, shea butter, palm oil, and the like).

In an embodiment, the dairy (or dairy alternative) product(s) comprise(s) from about 30 wt-% to about 95 wt-% of the frozen dessert composition, from about 40 wt-% to about 95 wt-% of the frozen dessert composition, from about 50 wt-% to about 95 wt-% of the frozen dessert composition, from about 60 wt-% to about 90 wt-% of the food product composition, or from about 60 wt-% to about 85 wt-% of the frozen dessert composition.

Additional Ingredients

The frozen dessert compositions described herein may optionally include additional ingredients. The presence of additional ingredients will vary based upon the type of frozen dessert composition having a portion or all of the nutritive sweeteners replaced with allulose and the LSS. Exemplary additional ingredients include, for example, remaining nutritive sweeteners (any portion not fully replaced by allulose and LSS); non-nutritive sweeteners (such as high potency sweeteners); partially-nutritive sweeteners; flavorings, extracts (e.g. vanilla and fruit flavorings) and/or flavoring liquor; stabilizing agents; bulking agents (e.g. maltodextrin, polydextrose, hydrocolloids including but not limited to xanthan gum, guar gum, glucose syrup of any kind, soluble fiber of any kind, oligosaccharides of any kind, any starch including native and modified, and the like); coloring additives, preservatives, antioxidants, fruit (whole, diced, mushed, purees, concentrates, and such) and combinations thereof.

In some embodiments, the optional additional ingredients include eggs or egg-derived products, fats, oils, water, additional dairy products, alcohol, gums, natural and/or artificial colors, natural and/or artificial flavors, salt, chocolate and/or cocoa, coconut and coconut derived products, spices, fruits and fruit-derived products, vegetables and vegetable derived products, legumes and legume-derived products, nuts and nut-derived products, acidulants, preservatives, stabilizers, antioxidants, proteins, amino acids, vitamins, minerals, and any other ingredients commonly formulated in a frozen dessert.

In some embodiments, the optional additional ingredients do not include non-digestible, non-flatous polysaccharides. Examples of such polysaccharides include for example, soluble or insoluble plant fibers, e.g., Promitor (resistant maltodextrin) and others described in WP2017/037111.

In an embodiment, the optional additional ingredients, when used, collectively, do not make up more than 50%, 45%, 40%, 35%, 30%, 25%, 20%, 15%, 10%, or 5% by weight of the frozen dessert composition.

Nutritive and Partially-Nutritive Sweeteners

The frozen dessert compositions described herein may include nutritive sweeteners (and/or partially nutritive sweeteners) in embodiments where allulose and the LSS does not fully replace the nutritive sweetener, such as sucrose and/or high DE glucose syrup. Examples of nutritive sweeteners include, but are not limited to, sucrose, cane sugar, fructose, glucose, glucose-fructose syrup, maple syrup, honey, molasses, erythritol, maltitol, lactitol, sorbitol, mannitol, xylitol, leucrose, trehalose, galactose, rhamnose, cyclodextrin (e.g., a-cyclodextrin, P-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrine, lactulose, melibiose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup, and combinations of any of the foregoing.

In embodiments where the frozen dessert compositions contain nutritive sweeteners, they comprise less than about 25 wt-%, less than about 20 wt-%, less than about 15 wt-%, less than about 10 wt-%, less than about 5 wt-%, or 0 wt-% of the frozen dessert composition.

Exemplary low calorie sweeteners include polyols. The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively.

Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group. Examples of polyols include, erythritol, maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect the taste of the sweetened compositions. A further example of a partially-nutritive sweetener is D-tagatose.

In embodiments where the frozen dessert compositions contain partially-nutritive sweeteners they comprise less than about 20%, less than about 15%, less than about 10 wt-%, less than about 5 wt-%, less than about 1 wt-%, less than about 0.1 wt-%, or less than about 0.01 wt-%, or 0 wt-% of the frozen dessert composition.

Non-Nutritive Sweeteners

The frozen dessert compositions may optionally include non-nutritive sweeteners in combination with the allulose and the LSS. Non-nutritive sweeteners (e.g. high potency sweeteners) can be included in the food product compositions to help increase the minor amount of sweetness that is lost upon addition of allulose (and LSS) (as allulose is 70% as sweet as sucrose). The loss of this sweetness might or might not be perceived by a typical consumer based on the other ingredients in the formulations and the total sugar replacement levels. Exemplary non-nutritive sweeteners (i.e. zero calorie sweeteners) include natural and artificial sweeteners, including high-potency sweeteners.

Exemplary natural non-nutritive sweeteners are those found in nature which may be in raw, extracted, purified, or any other form (e.g. via fermentation, bio-conversion), singularly or in combination thereof and characteristically have a sweetness potency greater than sucrose, fructose, or glucose. Non-limiting examples of natural zero calorie sweeteners include steviol glycosides, including rebaudioside A (Reb A), rebaudioside B (Reb B), rebaudioside C (Reb C), rebaudioside D (Reb D), rebaudioside D2 (Reb D2), rebaudioside D4 (Reb D4), rebaudioside E (Reb E), rebaudioside F (Reb F), rebaudioside G (Reb G), rebaudioside H (Reb H), rebaudioside I (Reb I), rebaudioside J (Reb J), rebaudioside K (Reb K), rebaudioside L (Reb L), rebaudioside M2 (Reb M2), rebaudioside M (Reb M) (also known as REB X), rebaudioside N (Reb N), rebaudioside O (Reb O), rebaudioside S (Reb S), rebaudioside T (Reb T), rebaudioside U (Reb U), rebaudioside V (Reb V), rebaudioside W (Reb W), rebaudioside Z1 (Reb Z1), rebaudioside Z2 (Reb Z2), and enzymatically glucosylated steviol glycosides; amino acids, tryptophans, steviolmonoside, steviolbioside, dulcoside A, dulcoside B, rubusoside, stevia, stevioside, mogroside, mogroside IV, mogroside V, mogroside VI, iso-mogroside V, grosmomoside, neomogroside, siamenoside, Luo Han Guo sweetener, monk fruit, siamenoside, monatin and its salts (monatin SS, RR, RS, SR), curculin, glycyrrhizic acid and its salts, thaumatin, monellin, mabinlin, brazzein, hemandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I. Natural high-potency sweeteners also include modified natural high-potency sweeteners.

Additional exemplary synthetic zero calorie (i.e. high-potency) sweeteners include sucralose, potassium acesulfame (Acesulfame-potassium), aspartame, alitame, saccharin, neohesperidin dihydrochalcone, cyclamate, neotame, advantame, N-[N-[3-(3-hydroxy-4-methoxyphenyl) propyl]-L-a-aspartyl]-L-phenylalanine I-methyl ester, N-[N-[3-(3-hydroxy-4-methoxyphenyl)-3-methylbutyl]-L-a-aspartyl]-L-phenylalanine I-methyl ester, N-[N-[3-(3-methoxy-4-hydroxyphenyl) propyl]-L-a-aspartyl]-L-phenylalanine I-methyl ester, salts thereof and the like. Synthetic high-potency sweeteners also include modified synthetic high-potency sweeteners.

In embodiments where the frozen dessert compositions contain non-nutritive sweeteners, they comprise less than about 10 wt-%, less than about 5 wt-%, less than about 1 wt-%, less than about 0.1 wt-%, or less than about 0.01 wt-%, or 0 wt-% of the frozen dessert composition.

Stabilizers

The frozen dessert compositions described herein can contain stabilizers or stabilizing agents, including for example emulsifying agents. Exemplary stabilizing agents include sodium alginate, carrageenan, locust bean gum, guar gum, pectin, xanthan, carboxymethyl cellulose, tara gum, gelatin, and the like. A further exemplary emulsifier is available under the tradename ALDOPERSE™ 0-20 KFG, which is a blend of mono- and diglycerides and Polysorbate 80. Stabilizers function in a frozen dessert composition, such as ice cream, to increase viscosity, aid in stabilization and reduce shrinkage in storage, along with slow the formulation of crystals (e.g. ice) during storage.

In an embodiment, the stabilizers comprise one or more of gums (e.g. cellulose gum), starches (e.g. modified waxy-maize starches), carrageenan, mono- and/or di-glycerides and disodium phosphate.

In an embodiment, stabilizers comprise from about 0 wt-% to about 10 wt-% of the composition, from about 0.01 wt-% to about 5 wt-% of the composition, or from about 0.1 wt-% to about 1 wt-% of the composition.

Flavorants and Extracts

The frozen dessert compositions described herein can contain various flavorants and extracts. In an embodiment, flavorants and extracts comprises from about 0 wt-% to about 20 wt-% of the composition, from about 0.1 wt-% to about 10 wt-% of the composition, or from about 1 wt-% to about 10 wt-% of the composition.

Exemplary Frozen Dessert Compositions

The frozen dessert compositions described herein can include various frozen desserts that can benefit from the use of allulose and the LSS to replace all or a portion of nutritive sweeteners, including sucrose and high DE glucose syrups. As a further benefit, the frozen dessert compositions described herein can continue to be made using known processes for making frozen dessert compositions without any additional or extensive processing steps.

Exemplary frozen desserts include, for example: ice cream, soft-serve ice cream, gelato, frozen custard, non-dairy (e.g. soy) ice cream, nut milk ice cream, coconut milk ice cream, frozen yogurt, frozen Greek yogurt, frozen kefir, parfait, sorbet, sherbet, milkshake, malt, and the like. In one embodiment, the frozen dessert composition is an ice cream.

Subject matter contemplated by the present disclosure is set out in the following numbered embodiments:

1. A frozen dessert composition comprising:
    at least about 2 wt-%, 2.5 wt-%, 3 wt-%, 3.5 wt-%, or 4 wt-% allulose (dry basis) or greater than 3.5 wt-% allulose (dry basis);
    at least one low sugar syrup, low sugar solid, or combination thereof; and
    at least one dairy or dairy alternative product;
    wherein said frozen dessert composition further comprises about 25% to about 50% by weight solids or about 28% to about 46% by weight solids.

2. The composition according to embodiment 1, wherein the low sugar syrup has (i) a DE>24, a DE of 25 to 40, or a DE of 26 to 34; (ii) a DP4 content less than 30%, less than about 25%, less than about 20%, or less than about 15% by weight; (iii) DP8+ content less than 25%, less than about 20%, less than about 15%, less than about 10%, or less than about 5% by weight; (iv) DP10+ content less than 25%, less than about 20%, less than about 15%, less than about 10%, or less than about 5% by weight; (v) a DP3+ content (per 100 grams of the composition) that is at least about ≥4.8; (vi) a (DP1+DP2)/DP3+ ratio that is at least about ≤2.8; or (vii) any combination of (i) to (vi).

3. The composition according to embodiment 1 or 2, wherein the composition has a percentage of solids within 5% of the percentage of solids of a full sugar control composition, wherein the control composition has not replaced one or more nutritive sweeteners with allulose and low-sugar syrup and/or low-sugar solids, and wherein said composition has an average hardness measurement (grams of force) that is within about 20% of the average hardness measurement of the sugar-control composition.

4. The composition according to any preceding embodiment, wherein the allulose is a liquid syrup comprising at least about 85% allulose and about 15% other monosaccharides and/or disaccharides, at least about 90% allulose and about 10% other monosaccharides and/or disaccharides, or at least about 95% allulose and about 5% other monosaccharides and/or disaccharides.

5. The composition according to any preceding embodiment, wherein the composition comprises an amount of about 2-10 wt-% allulose (dry basis), about 3.5-10 wt-% allulose (dry basis), or about 4-10 wt-% allulose (dry basis).

6. The composition according to any preceding embodiment, wherein the low sugar syrup or low sugar solid has a DP1+DP2 content of less than 25%, less than about 20%, less than about 18%, less than about 17%, less than about 16%, less than about 15%, less than about 14%, less than about 13%, less than about 12% less than about 11%, or less than about 10%.

7. The composition according to any preceding embodiment, wherein one of the nutritive sweeteners at least partially replaced with the allulose and/or the low sugar syrup/solid is sucrose and wherein said nutritive sweetener comprises less than about 25% of the composition, less than about 20% of the composition less than about 15% of the composition, less than about 10% of the composition, or less than about 5% of the composition.

8. The composition according to any preceding embodiment, further comprising (i) an additional non-nutritive or partially-nutritive sweetener; (ii) one or more additional ingredient; (iii) or a combination thereof.

9. The composition of embodiment 8, wherein the non-nutritive sweetener is a 5 high potency sweetener.

10. The composition according to any preceding embodiment, wherein the frozen dessert composition has at least a 20% added sugar reduction, 25% added sugar reduction, 30% added sugar reduction, 40% added sugar reduction, 50% added sugar reduction, 75% added sugar reduction, 80% added sugar reduction, or a 100% added sugar reduction in comparison to a full-sugar frozen dessert composition.

11. The composition according to any preceding embodiment, wherein said composition has at least a 2% calorie reduction, at least a 5% calorie reduction, at least a 10% calorie reduction, at least a 15% calorie reduction, or at least a 20% calorie reduction in comparison to a full-sugar frozen dessert composition.

12. The composition according to any preceding embodiment, wherein the composition comprises from about 30 wt-% to about 95 wt-% of the dairy or dairy alternative products, or from about 50 wt-% to about 90 wt-% of the dairy or dairy alternative products.

13. The composition according to any preceding embodiment, wherein the dairy product is a combination of cream and milk.

14. The composition according to any preceding embodiment, wherein the frozen dessert composition is ice cream.

15. A use of an allulose and low-sugar syrup and/or low sugar solid containing sugar replacement to enhance the hardness and texture of a low-sugar, low-caloric frozen dessert composition containing allulose comprising:

replacing at least a portion of a nutritive sweetener in a frozen dessert composition with allulose and a low sugar syrup, low sugar solid, or combination thereof; and forming a frozen dessert composition that has (i) a percentage of solids within 5% of the percent of solids of a full sugar control composition, wherein the full-sugar control composition has not replaced the nutritive sweetener with allulose and the low sugar syrup, low sugar solid, or combination thereof, and (ii) an average hardness measurement (grams of force) that is within about 20% of the average hardness measurement of the full-sugar control composition.

16. The use according to embodiment 15, wherein the allulose comprises at least about 2 wt-%, 2.5 wt-%, 3 wt-%, 3.5 wt-%, or 4 wt-% allulose (dry basis) or greater than 3.5 wt-% allulose (dry basis) of the frozen dessert composition, and wherein the allulose is a liquid syrup comprising at least about 85% allulose and about 15% other monosaccharides and/or disaccharides, at least about 90% allulose and about 10% other monosaccharides and/or disaccharides, or at least about 95% allulose and about 5% other monosaccharides and/or disaccharides.

17. The use according to embodiment 15 or 16, wherein the composition comprises an amount of about 2-10 wt-% allulose (dry basis), about 3.5-10 wt-% allulose (dry basis), or about 4-10 wt-% allulose (dry basis).

18. The use according to any one of embodiments 15-17, wherein the frozen dessert composition has at least a 20% added sugar reduction, 25% added sugar reduction, 30% added sugar reduction, 40% added sugar reduction, 50% added sugar reduction, 75% added sugar reduction, 80% added sugar reduction, or a 100% added sugar reduction in comparison to the full-sugar control composition.

19. The use according to any one of embodiments 15-18, wherein the frozen dessert composition has at least a 2% calorie reduction, at least a 5% calorie reduction, at least a 10% calorie reduction, at least a 15% calorie reduction, or at least a 20% calorie reduction in comparison to the full-sugar control composition.

20. The use according to any one of embodiments 15-19, wherein the frozen dessert composition is an ice cream.

21. The use according to any one of embodiments 15-20, wherein the frozen dessert composition has (i) a DE>24, a DE of 25 to 40, or a DE of 26 to 34; (ii) a DP4 content less than 30%, less than about 25%, less than about 20%, or less than about 15% by weight; (iii) DP8+ content less than 25%, less than about 20%, less than about 15%, less than about 10%, or less than about 5% by weight; (iv) DP10+ content less than 25%, less than about 20%, less than about 15%, less than about 10%, or less than about 5% by weight; (v) a DP3+ content (per 100 grams of the composition) that is at least about ≥4.8; (vi) a (DP1+DP2)/DP3+ ratio that is at least about ≤2.8; or (vii) any combination of (i) to (vi).

EXAMPLES

The embodiments described hereinabove are further defined in the following non-limiting Examples. It should be understood that these Examples, while describing various embodiments of the invention, are given by way of illustration only. From the above discussion and these Examples, one skilled in the art can ascertain the essential characteristics of the invention and, without departing from the spirit and scope thereof, change and modify the embodiments described herein to adapt it to various usages and conditions. Thus, various modifications of the embodiments described herein, in addition to those shown and described herein, will be apparent to those skilled in the art from the foregoing description. Any such modifications are also intended to be encompassed by the claims appended hereto. The features disclosed in the description and Examples set forth herein, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

Ice cream compositions analyzed in the following Examples were made according to the following processes for both 5% fat ice cream (Tables 2-3) and 10% fat ice cream (Table 4):

1) Pasteurization: A pre-blend of dry ingredients was made before processing. The corn syrup, if using, was weighed and dissolved in a portion of the milk or water. All ingredients (milk, water, dry ingredients, dissolved corn syrup, etc.) were blended, except cream and flavor, and hydrated under constant agitation for approximately 20 mins in a Likwifier. The cream was gently mixed into the blend before the mixture was sent through the microthermics (as follows) processor. The mixture was subjected to 84° C. final heat with a 30 sec hold tube. The mixture was above 79° C. at end of the hold tube and subsequently preheated at 66° C. and subjected to 1500/500 PSI homogenization. The mixture was cooled to about 13° C. or less and collected in clean, sanitized containers and refrigerated immediately. Small containers of mixture were also collected for viscosity and solids measurements.

2) Freezing: Flavor was subsequently added to the prepared mixture. The weight of 500 mL of the prepared mixture was taken, with target of 100% over-run (+5%). % over-run calculation=(Wt. of mix−Wt. of same vol. of ice cream)/Wt. of same vol. of ice cream× 100%. Once the draw temperature stabilized to around −6° C., the ice-cream was collected. Sample cups were filled and put on dry ice until the current batch was completed, additional dry ice was scooped on top of the ice cream to arrive at a core temp of −18° C. as quickly as possible. Each set was moved all at once to the blast freezer, which was set to about −34° C. Product stayed in the blast freezer for about 4 hours before being transferred to normal frozen storage (−13° C.).

The allulose used in the Examples is ASTRAEA® Liquid Allulose, with 95% purity and at 74% solids.

TABLE 2

Reduced fat ice cream formulations with 2.5-10% (dry basis) Allulose

| Ingredients (%) | Full Sugar (Control) | 2.5% Allulose | 3.5% Allulose | 5% Allulose | 7% Allulose | 10% Allulose |
|---|---|---|---|---|---|---|
| NFDM | 7.00 | 7.09 | 7.13 | 7.0 | 7.26 | 7.36 |
| Skim Milk | 59.10 | 58.03 | 57.64 | 57.05 | 56.28 | 55.12 |
| Heavy Cream | 13.50 | 13.50 | 13.50 | 13.50 | 13.50 | 13.50 |
| Sucrose | 12.00 | 9.50 | 8.50 | 7.00 | 5.00 | 2.00 |
| 36DE Corn Syrup | 8.00 | 8.00 | 8.00 | 8.00 | 8.00 | 8.00 |
| Low Sugar Syrup | 0.00 | 0.00 | 0.00 | 0.00 | 0.00 | 0.00 |
| Liquid Allulose | 0.00 | 3.38 | 4.73 | 6.75 | 9.46 | 13.52 |
| Emulsifier | 0.10 | 0.10 | 0.10 | 0.10 | 0.10 | 0.10 |
| Gum polysaccharide | 0.20 | 0.20 | 0.20 | 0.20 | 0.20 | 0.20 |
| Vanilla | 0.10 | 0.20 | 0.20 | 0.20 | 0.20 | 0.20 |
| TOTAL | 100.00 | 100.00 | 100.00 | 100.00 | 100.00 | 100.00 |
| % Solids in the Formulation | 36.7 | 36.7 | 36.7 | 37.1 | 36.7 | 36.7 |
| Freezing Point Depression (° C.) | −2.65 | −3.05 | −3.23 | −3.51 | −3.83 | −4.42 |

TABLE 3

Reduced fat ice cream formulations with 4-10% (dry basis) Allulose and Low Sugar Syrup/Solid

| Ingredients (%) | Full Sugar (Control) % | 4% LSS Allulose + LSS % | 5% LSS Allulose + LSS % | 7% LSS Allulose + LSS % | 10% Allulose + LSS % |
|---|---|---|---|---|---|
| NFDM | 7.00 | 7.42 | 7.19 | 6.80 | 5.00 |
| Skim Milk | 59.10 | 54.78 | 57.19 | 52.67 | 52.46 |
| Heavy Cream | 13.50 | 13.50 | 13.50 | 13.50 | 13.50 |
| Sucrose | 12.00 | 4.50 | 3.50 | 0.00 | 0.00 |
| 36DE Corn Syrup | 8.00 | 0.00 | 0.00 | 0.00 | 0.00 |
| Low Sugar Syrup | 0.00 | 13.89 | 11.37 | 17.06 | 0.00 |
| Liquid Allulose | 0.00 | 5.40 | 6.75 | 9.46 | 13.52 |
| 22DE Low Sugar Solids | 0.00 | 0.00 | 0.00 | 0.00 | 8.00 |
| 24DE Low Sugar Solids | 0.00 | 0.00 | 0.00 | 0.00 | 7.00 |
| Reb M Stevia Sweetener | 0.00 | 0.01 | 0.01 | 0.01 | 0.02 |
| Emulsifier | 0.10 | 0.10 | 0.10 | 0.10 | 0.10 |
| Gum polysaccharide | 0.20 | 0.20 | 0.20 | 0.20 | 0.20 |
| Vanilla | 0.10 | 0.20 | 0.20 | 0.20 | 0.20 |
| TOTAL | 100.00 | 100.00 | 100.00 | 100.00 | 100.00 |
| % Solids in the Formulation | 36.7 | 38.1 | 36.1 | 38.7 | 40.1 |
| Freezing Point Depression (° C.) | −2.65 | −3.17 | −3.09 | −3.79 | −4.22 |

TABLE 4

Full fat ice cream formulations with 4-5% (dry basis) Allulose and Low Sugar Syrup

| Ingredients (%) | Full Sugar (Control) | 5% Allulose | 5% Allulose + LSS | 4% Allulose + LSS |
|---|---|---|---|---|
| NFDM | 5.00 | 5.20 | 5.18 | 5.41 |
| Skim Milk | 47.50 | 45.55 | 45.69 | 43.29 |
| Heavy Cream | 27.00 | 27.00 | 27.00 | 27.00 |
| Sucrose | 12.00 | 7.00 | 3.50 | 4.50 |
| 36DE Corn Syrup | 8.00 | 8.00 | 0.00 | 0.00 |
| Low Sugar Syrup | 0.00 | 0.00 | 11.37 | 13.89 |
| Liquid Allulose | 0.00 | 6.75 | 6.75 | 5.40 |
| Stevia Sweetener | 0.00 | 0.00 | 0.01 | 0.01 |
| Emulsifier | 0.10 | 0.10 | 0.10 | 0.10 |
| Gum polysaccharide | 0.20 | 0.20 | 0.20 | 0.20 |
| Vanilla | 0.20 | 0.20 | 0.20 | 0.20 |
| TOTAL | 100.00 | 100.00 | 100.00 | 100.00 |
| % Solids in the Formulation | 39.4 | 39.4 | 38.4 | 40.4 |
| Freezing Point Depression (° C.) | −2.87 | −3.44 | −3.02 | −3.11 |

Example 1

5% Fat Ice Cream Formulation Evaluation for Hardness, Sensory Evaluation, Measured Sugar/Caloric Reduction, and DP Distribution Hardness Evaluations. The reduced fat ice cream formulations of Table 2 were prepared to compare hardness and textural attributes of the full sugar control with compositions containing increasing levels of allulose. The full sugar control formulation used 12% sugar (sucrose). Allulose is used at 2.5-10% dry basis levels to reduce the sugar/calorie of the ice-cream. The total solids in the formulations are balanced similar to the full sugar control in Table 2. Table 2 also shows the freeze-point depression (C) of the formulations. Allulose being a monosaccharide, reduces the freeze-point depression more than sucrose as a disaccharide (lower FPD° C. values as allulose content increases). This results in a softer ice cream composition.

The hardness of the ice cream formulations was measured using texture analysis (TAXT2 Texture Analyzer) ("TA-XT"). The probe was placed in the freezer where the product is stored to allow it to equilibrate to the product temperature for at least 1 hour. The product and the probe were quickly removed from the freezer. The probe was attached to the TA-XT, and the product was centered beneath the probe and the test was performed immediately. The probe was placed in the freezer for 20-30 minutes between each test using the following conditions:

Use 30 kg load cell
Attachment: TA 55 (5 mm diameter, 35 mm height) stainless steel cylinder probe
Settings:
  Test Mode: Compression
  Pre-test speed: 2 mm/s
  Test speed: 0.2 mm/s
  Post-test speed: 4 mm/s
  Target Mode: Distance, 25 mm
  Trigger Type: Auto
  Trigger Force: 0.5 g 1 reading per sample from 3-4 individual cups was recorded, with the hardness measurements shown graphically in FIG. 1.

At 2.5% and 3.5% levels (dry basis), the softening effect is not significant enough to require reformulation of the ice cream product. This is shown when factoring the statistical significance of the samples containing 2.5-3.5% allulose compared to the Control (full sugar). However, the decrease is hardness is magnified at increasing levels of Allulose, namely greater than 3.5% (dry basis). When the Allulose is at 5% (dry basis), it is demonstrated that the average ice cream hardness reduces notably. At 7% and 10% levels, the effect is more significant.

Low sugar syrup/solids (LSS) were added to ice cream compositions that demonstrated softening issues with the increased levels of allulose. The ice cream formulations of Table 3 were evaluated where again the % solids in the formulation were aimed to be kept comparable to full sugar control. FIG. 2 shows the average hardness measured and demonstrated increased average hardness values compared to the initial tests depicted in FIG. 1. The results show that the addition of the LSS increased the average hardness of the allulose-containing formulations making them comparable to full sugar control, notably within 20% of the hardness measurements of the 5% fat full sugar control. The freezing-point depression ("FPD") (C) also showed improvement over the respective values of ice cream formulations containing allulose alone.

Figure 2:
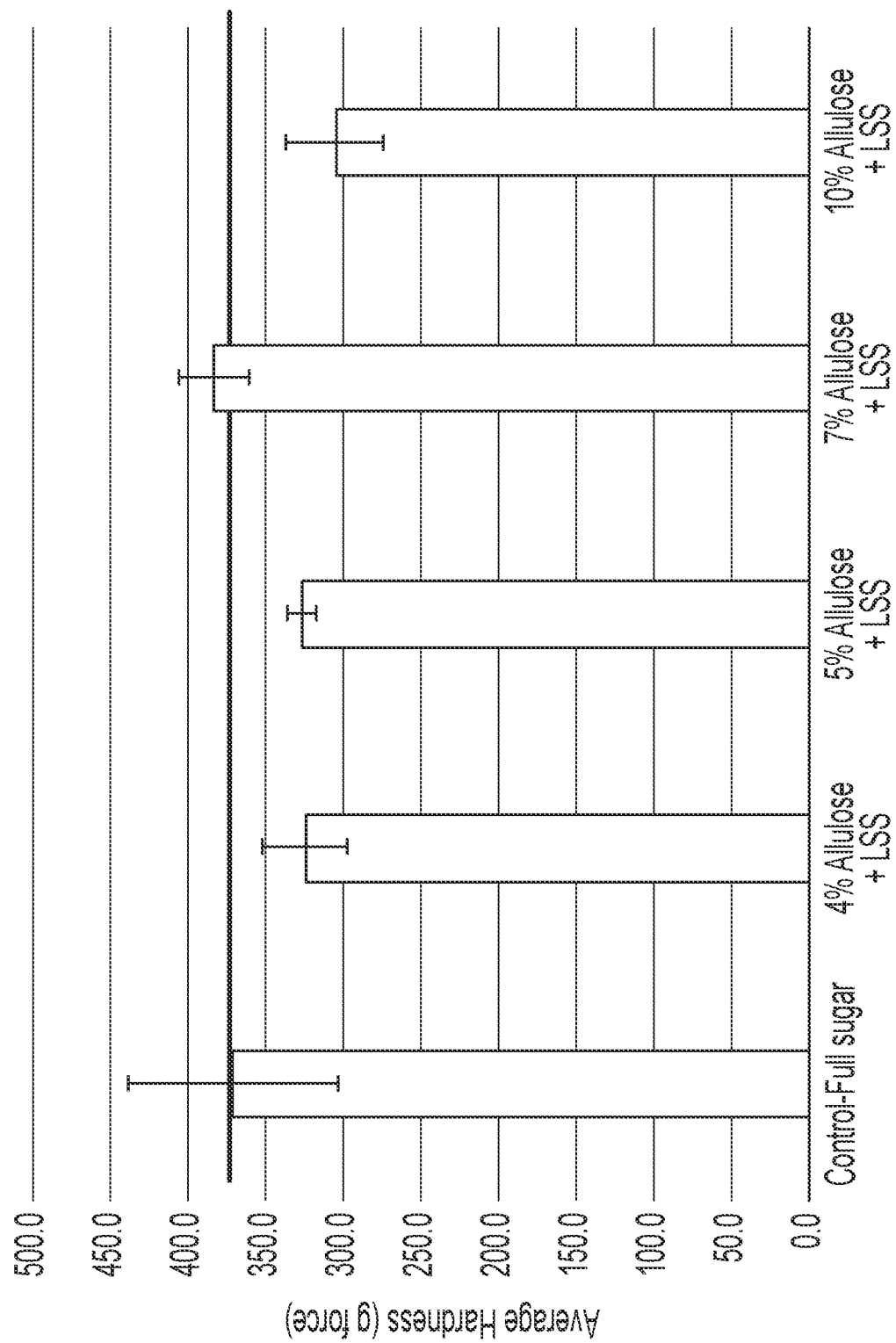
FIG. 2 shows measurements of hardness of full sugar control and 4-10% (dry basis) allulose with LSS reduced fat ice-cream samples as described in Example 1.
Figure 3:
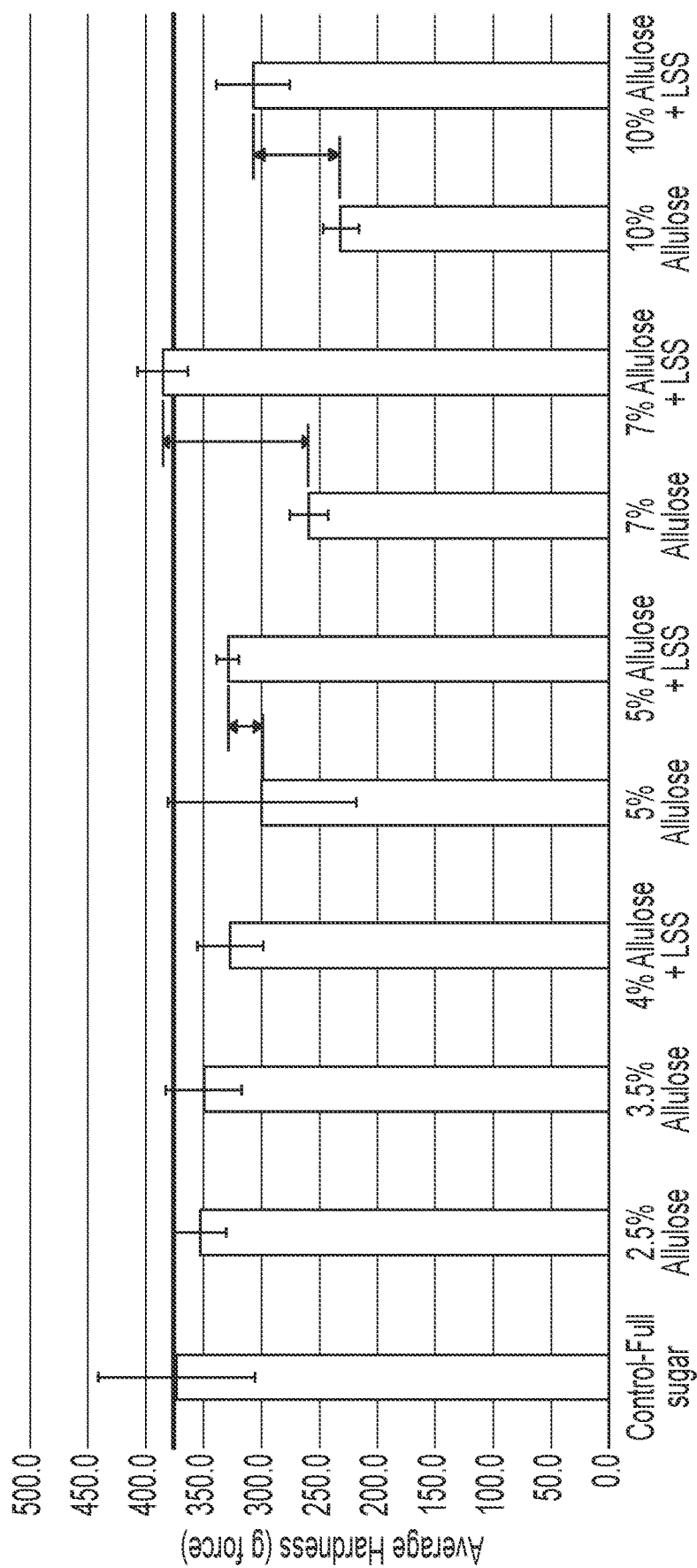
FIG. 3 shows measurements of hardness of full sugar control and Allulose containing and Allulose/LSS containing reduced fat ice-cream samples as described in Example 1.

A comparison of FIGS. 1 and 2 are shown in FIG. 3. Notably there is a significant increase in hardness of the ice cream formulations containing: 5% Allulose+LSS compared to 5% Allulose (with 36DE); 7% Allulose+LSS compared to 7% Allulose (with 36DE); and also 10% Allulose+LSS compared to 10% Allulose (with 36DE). The incorporation of the LSS with the Allulose outperforms—in building back hardness in the frozen ice cream—the Allulose with a non-LSS, namely the 36DE which does not classify as an LSS as it has a DP1+DP2 content of about 25+.

Sensory Evaluation for Hardness. The reduced fat ice cream formulations of Table 2 were provided for texture evaluation of the reduced fat ice cream samples by a trained sensory panel. Intensity of hardness was measured using a 15 point Universal Scale (from 1 to 15; 1 being the softest and 15 being the hardest). The results are in Table 5.

TABLE 5

Sensory evaluation results for reduced fat (5%) ice cream

| Attribute | Control-Full sugar | 5% Allulose | 5% Allulose + LSS | 4% Allulose + LSS |
|---|---|---|---|---|
| Ice-cream hardness | 11.15 | 8.15 | 12.75 | 11.95 |

Similar to the instrumental texture analysis, sensory test shows that when allulose is used alone, it is perceived as softer (decrease from 11.15 score to 8.15 score). Benefi- cially, when formulated with LSS, the comparable hardness was built back as perceived by the panelists.

Sugar/Caloric Reduction Measurements. Additional assessment of percent calorie and added sugar reduction for allulose containing ice cream formulations were completed. Added sugar is defined as total mono- and disaccharides. Even though allulose is a monosaccharide (DP1), because it is metabolized very differently than traditional sugars, it is not counted in "added" sugar category (FDA Draft Guidance "The Declaration of Allulose and Calories from Allulose on Nutrition and Supplement Facts Labels: Guidance for Industry" dates April 2019). The results are shown in Tables 6-7.

TABLE 6

Percent calorie and sugar reduction for reduced fat ice cream with Allulose

|  | Control-Full sugar | 2.5% Allulose | 3.5% Allulose | 5% Allulose | 7% Allulose | 10% Allulose |
|---|---|---|---|---|---|---|
| Calories (kcal/100 g) | 160 g | 160.0 g | 150.0 g | 150.0 g | 140.0 g | 130.0 g |
| Calorie Reduction (%) | NA | 0% | 6.25% | 6.25% | 12.5% | 18.75% |
| Added Sugars (g/100 g) | 13.6 g | 11.2 g | 10.3 g | 8.8 g | 7.0 g | 4.1 g |
| Added Sugar Reduction (%) | NA | 17.6% | 24.3% | 35.3% | 48.5% | 69.9% |

TABLE 7

Percent calorie and sugar reduction for reduced fat ice cream with Allulose and LSS

|  | Control-Full sugar | 4% Allulose + LSS | 5% Allulose + LSS | 7% Allulose + LSS | 10% Allulose + LSS |
|---|---|---|---|---|---|
| Calories (kcal/100 g) | 160 g | 160.0 g | 150.0 g | 150.0 g | 150.0 g |
| Calorie Reduction (%) | NA | 0% | 6.25% | 6.25% | 6.25% |
| Added Sugars (g/100 g) | 13.6 g | 6.5 g | 5.2 g | 2.5 g | 2.4 g |
| Added Sugar Reduction (%) | NA | 52.2% | 61.7% | 81.6% | 82.4% |

Table 6 shows the calorie and added sugar reduction on the formulations studied. When allulose is used by itself between 2.5 and 10% levels, it results in 17.6-69.9% added sugar reduction and 6.25-18.75% calorie reduction. When allulose is used in conjunction with LSS, the calorie reduction is not much affected, but the added sugar reduction potential is increased significantly up to 82.4%. Beneficially, the results show significant sugar reduction and also calorie reduction with the evaluated ice cream products without compromising the firmness and texture of the ice cream as a result of the use of the LSS with the allulose.

DP Distributions for Reduced Fat Formulations. The reduced fat (5%) ice cream formulations of Tables 2-3 were further analyzed for the DP distribution and combination ratios of the formulas, shown in Tables 8-9. As referred to herein, DP1 and DP2 are mono- and disaccharides, respectively, and these are the defined terms for added sugars. Even though allulose is a monosaccharide (DP1), because it is metabolized very differently than traditional sugars, it is not counted in "added" sugar category (FDA Draft Guidance "The Declaration of Allulose and Calories from Allulose on Nutrition and Supplement Facts Labels: Guidance for Industry" dates April 2019).

TABLE 8

DP combination ratios of
Control and Allulose-containing systems

| Reduced Fat (5%) Formulations | Control- Full Sugar | 2.5% Allu- lose | 3.5% Allu- lose | 5% Allu- lose | 7% Allu- lose | 10% Allu- lose |
|---|---|---|---|---|---|---|
| Added sugar content/100 g | 13.6 g | 11.2 g | 10.3 g | 8.8 g | 7.0 g | 4.1 g |
| DP1 + DP2 content/100 g | 13.6 g | 13.6 g | 13.6 g | 13.6 g | 13.6 g | 13.6 g |
| DP3+ content/100 g | 4.8 g | 4.8 g | 4.8 g | 4.8 g | 4.8 g | 4.8 g |
| (DP1 + DP2)/DP3+ | 2.8 | 2.8 | 2.8 | 2.8 | 2.8 | 2.8 |

As shown in Table 8, the Control (full sugar) composition compared to allulose-only sugar replacement (from 2.5-10%) shows a maintained DP3+ content (per 100 grams of the ice cream composition) as the sucrose is replaced with increasing amounts of allulose, however the amount of corn syrup is maintained for the formulations to maintain an equivalent percentage of solids in the ice cream compositions. Accordingly, the DP3+ measurement is at least about ≥4.8. In addition, Table 8 shows that the (DP1+DP2)/DP3+ ratio is constant at 2.8. As the allulose in the compositions increases from 2.5% to 10% the DP1 content increases; however, the DP2 content decreases as the sucrose is decreased.

TABLE 9

DP combination ratios of Control and Allulose + LSS systems

| Reduced Fat (5%) Formulations | Control- Full Sugar | 4% Allulose + LSS | 5% Allulose + LSS | 7% Allulose + LSS | 10% Allulose + LSS |
|---|---|---|---|---|---|
| Added sugar content/100 g | 13.6 g | 6.5 g | 5.2 g | 2.5 g | 2.4 g |
| DP1 + DP2 content/100 g | 13.6 g | 10.3 g | 9.9 g | 9.2 g | 11.9 g |
| DP3+ content/100 g | 4.8 g | 9.2 g | 7.5 g | 11.3 g | 12.5 g |
| (DP1 + DP2)/DP3+ | 2.8 | 1.1 | 1.3 | 0.8 | 1.0 |

As shown in Table 9, the Control (full sugar) composition compared to allulose and LSS-containing sugar replacement (from 4-10% allulose) shows an increase in DP3+ content (per 100 grams of the ice cream composition) as the sucrose is replaced with increasing amounts of LSS in addition to the allulose, such that the DP3+ measurement is ≥4.8 in all evaluated frozen dessert compositions (9.2, 7.5, 11.3, and 12.5, respectively). In addition, Table 9 shows that the (DP1+DP2)/DP3+ ratio of the reduced fat frozen dessert compositions is ≤2.8 (1.1, 1.3, 0.8, and 1.0, respectively).

Example 2

10% Fat Ice Cream Formulation Evaluation for Hardness and Measured Sugar/Caloric Reduction Hardness Evaluations. The full fat ice cream formulations of Table 3 were prepared to compare hardness and textural attributes of the full sugar control with compositions containing increasing levels of allulose. The full sugar control formulation uses 12% sugar (sucrose). Allulose is used at 4-5% dry basis levels to reduce the sugar/calories of the ice-cream. The total solids in the formulations are balanced similar to the full sugar control in Table 3. Table 3 also shows the FPD (° C.) of the formulations. The hardness was measured according to the same method described in Example 1.

Figure 4:
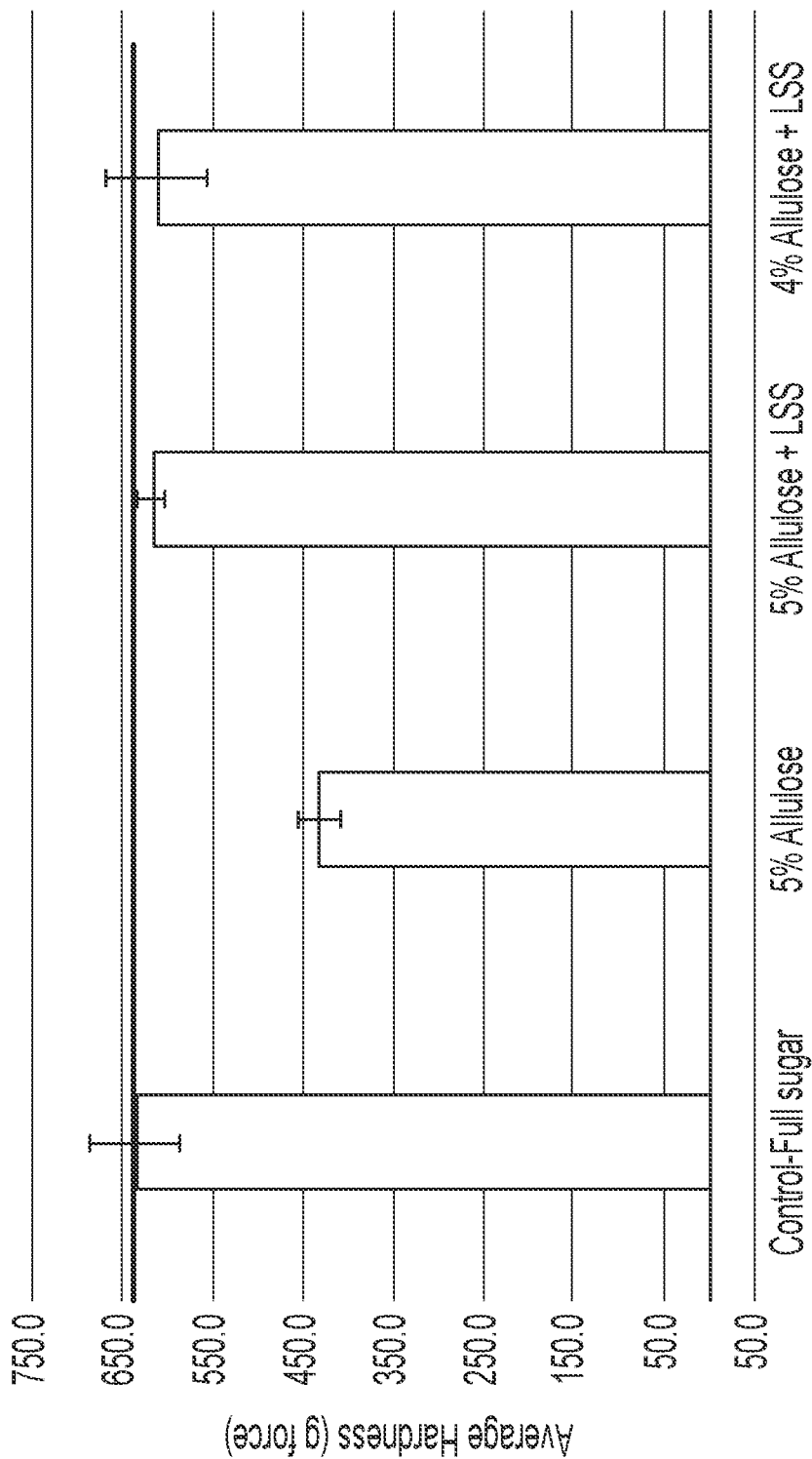
FIG. 4 shows measurements of hardness of full sugar control and 4-5% (dry basis) allulose with LSS in full fat ice-cream samples as described in Example 2.

The same formulation challenge observed in Example 1 for 5% fat ice cream is further confirmed for 10% fat ice cream as shown in Table 3 and FIG. 4. Similar to reduced fat formulations, allulose by itself causes softening in the ice cream and allulose in conjunction with LSS enables comparable hardness to full sugar control, notably within 10% of the hardness measurements of the 10% fat full sugar control. The effect is also demonstrated with the FPD (° C.), with a lower FPD temperature when allulose is used alone, and an FPD temperature that is close to the full-sugar Control when allulose is used in conjunction with LSS (Table 3). FIG. 4 shows the increase in hardness comparable to the full-sugar Control when both the 4% and 5% allulose are combined with an LSS, providing increased hardness compared to the 5% allulose alone.

Beneficially, the Examples testing hardness show that the reduced sugar/calorie ice-cream maintains the texture/hardness of a full-sugar formulation-both for reduced fat (5%) and full fat ice cream formulations (10%).

Sugar/Caloric Reduction Measurements. Additional assessment of percent calorie and added sugar reduction for allulose containing ice cream formulations were completed. Added sugar is defined as total mono- and disaccharides. Even though allulose is a monosaccharide (DP1), because it is metabolized very different than traditional sugars, it is not counted in "added" sugar category (FDA Draft Guidance "The Declaration of Allulose and Calories from Allulose on Nutrition and Supplement Facts Labels: Guidance for Industry" dates April 2019). The results are shown in Table 10.

TABLE 10

Percent calorie and sugar reduction for full fat
ice cream with Allulose and LSS

| | Control- Full sugar | 5% Allulose | 5% Allulose + LSS | 4% Allulose + LSS |
|---|---|---|---|---|
| Calories (kcal/100 g) | 160 g | 160.0 g | 150.0 g | 150.0 g |
| Calorie Reduction (%) | NA | 0% | 6.25% | 6.25% |
| Added Sugars* (g/100 g) | 13.6 g | 11.2 g | 10.3 g | 8.8 g |
| Added Sugar Reduction (%) | NA | 17.6% | 24.3% | 35.3% |

Table 10 shows the calorie and added sugar reduction on the full fat formulations studied. At 5% allulose use level, combination with LSS provides 6.7% more added sugar reduction than allulose use alone. In addition, up to 6.25% calorie reduction was possible at 5% allulose use level compared to full sugar control in the full fat ice cream formulations. Again, the results show significant sugar reduction and significant calorie reduction with the evaluated ice cream products without compromising the firmness and texture of the ice cream as a result of the use of the LSS with the allulose. Beneficially, the results are shown to benefit both full fat and reduced fat ice cream products, along with ranges of allulose in the products (of at least 3.5%-10%).

DP Distributions for Reduced Fat Formulations. The full fat (10%) ice cream formulations of Table 3 were further analyzed for the DP distribution and combination ratios of the formulas as shown in Table 11. As referred to herein, DP1 and DP2 are mono- and disaccharides, respectively and these are the defined terms for added sugars. Even though allulose is a monosaccharide (DP1), because it is metabolized very different than traditional sugars, it is not counted in "added" sugar category (FDA Draft Guidance "The Declaration of Allulose and Calories from Allulose on Nutrition and Supplement Facts Labels: Guidance for Industry" dates April 2019).

TABLE 11

DP combination ratios of Control and Allulose v. Allulose + LSS systems

| Full Fat (10%) Formulations | Control-Full Sugar | 5% Allulose | 5% Allulose + LSS | 4% Allulose + LSS |
|---|---|---|---|---|
| Added sugar content/100 gr | 13.6 g | 8.8 g | 5.2 g | 6.5 g |
| DP1 + DP2 content/100 gr | 13.6 g | 13.6 g | 9.9 g | 10.3 g |
| DP3+ content/100 gr | 4.8 g | 4.8 g | 7.5 g | 9.2 g |
| (DP1 + DP2)/DP3+ | 2.8 | 2.8 | 1.3 | 1.1 |

As shown in Table 11, the results are consistent with those described above for the reduced fat frozen dessert compositions in Tables 8-9. Namely the frozen dessert compositions show an increase in DP3+ content (per 100 grams of the ice cream composition) as the sucrose is replaced with increasing amounts of LSS in addition to the allulose, such that the DP3+ measurement is ≥4.8 in all evaluated frozen dessert compositions (4.8, 7.5, and 9.2, respectively). In addition, Table 11 shows that the (DP1+DP2)/DP3+ ratio of the frozen dessert compositions is ≤2.8 (1.3 and 1.1).

What is claimed is:

1. A method of making a low caloric frozen dessert composition comprising:
   mixing (i) allulose, (ii) a low sugar syrup, and (iii) a dairy ingredient or alternative dairy; ingredient to form a mixture and freezing the mixture wherein
   a) the allulose is in an amount from about 4 to about 10% by weight of the composition, dry basis;
   b) the low sugar syrup is an amount from 5 wt-% to 50 wt-% of the frozen dessert composition and the low sugar syrup or low sugar solid comprises monosaccharides ("DP1"), disaccharides ("DP2"), polysaccharides having a degree of polymerization of 4 ("DP4"), polysaccharides having degree of polymerization of 8 or more ("DP8"), and polysaccharides having degree of polymerization of 10 or more ("DP10+") wherein the sum of DP1 and DP2 ("DP1+DP2") in the syrup or solid is less than 25% by weight of the syrup or solid, the DP4 is content less than 30% by weight of the syrup, the DP8+ content is less than 25% by weight of the syrup, and the DP10+ content less than 25% by weight of the syrup;
   c) wherein the frozen dessert composition further comprises about 25% to about 50%, weight percent, solids content, and
   d) the frozen dessert composition comprises less than about 25% nutritive sweetener by weight of the composition.

2. The method according to claim 1, wherein the allulose is a liquid syrup comprising at least about 85% allulose and about 15% of one or more of other monosaccharides and disaccharides.

3. The method according to claim 1, wherein the frozen dessert composition is an ice cream.

4. The method according to claim 1, wherein the the low sugar syrup has a dextrose equivalent from 25 to 40.

5. The method according to claim 1, wherein the frozen dessert composition further comprises polysaccharides having a degree of polymerization of at least 3 ("DP3+") wherein the DP3+ content is greater than or equal to 4.8 grams polysaccharide per 100 grams of the composition.

6. The method according to claim 1, wherein the frozen dessert composition comprises DP3+ and a ratio of (DP1+DP2)/DP3+ is less than or equal to 2.8.

* * * * *